Figure 1:
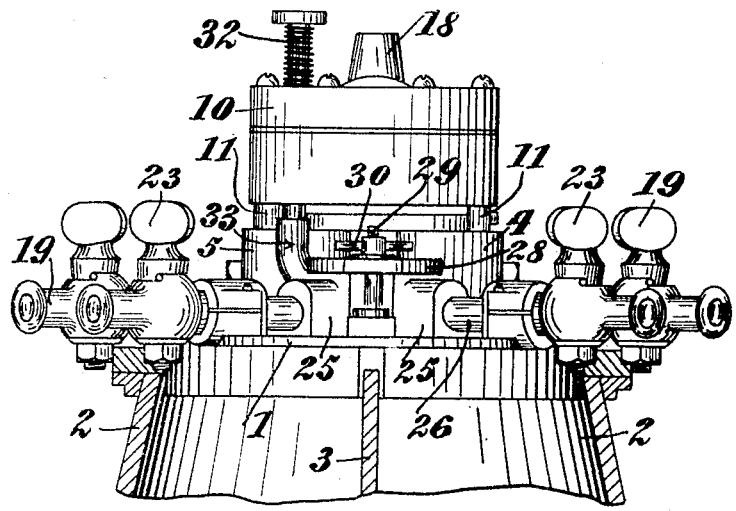

R. KENNEDY.
MILKING MACHINE.
APPLICATION FILED JAN. 12, 1910.

1,064,489.

Patented June 10, 1913.

7 SHEETS—SHEET 1.

Witnesses:
O. F. Nagle.
L. Couville.

Inventor
Robert Kennedy.
By Wiedersheim & Fairbanks.
Attorneys.

R. KENNEDY.
MILKING MACHINE.
APPLICATION FILED JAN. 12, 1910.

1,064,489.

Patented June 10, 1913.
7 SHEETS—SHEET 2.

Witnesses:
P. F. Nagle.
L. Conville.

Inventor:
Robert Kennedy.
By Wiedersheim & Fairbanks.
Attorneys.

R. KENNEDY.
MILKING MACHINE.
APPLICATION FILED JAN. 12, 1910.
1,064,489.
Patented June 10, 1913.
7 SHEETS—SHEET 3.
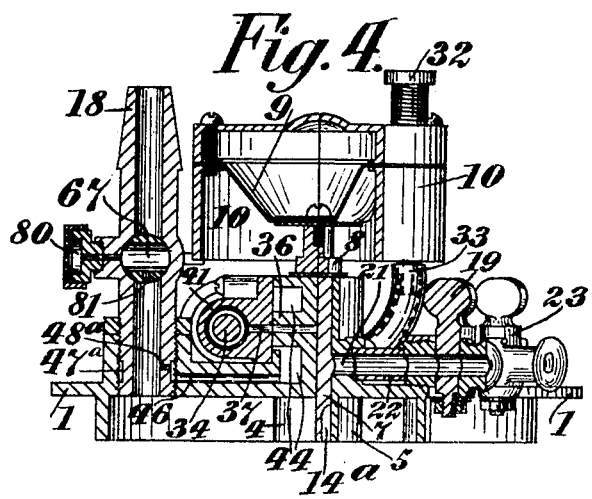
Fig. 4.
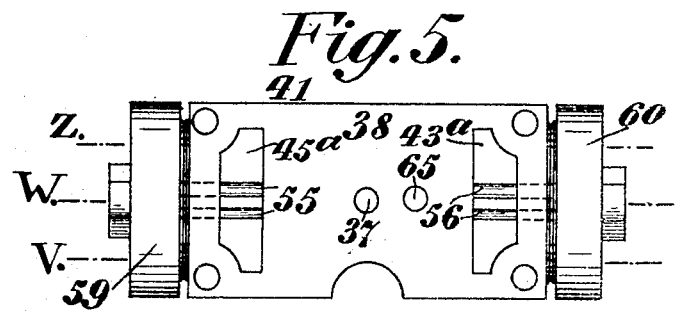
Fig. 5.
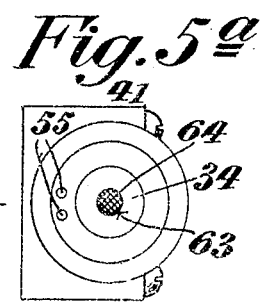
Fig. 5ª.
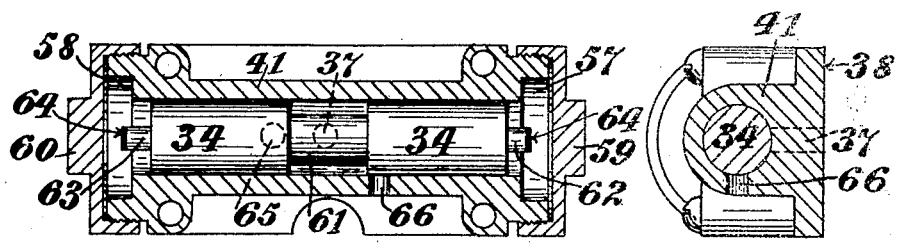
Fig. 6.                Fig. 6ª.
Witnesses:
O. F. Nagle.
L. Orville.
Inventor:
Robert Kennedy.
By Wiedersheim & Fairbanks,
Attorneys.

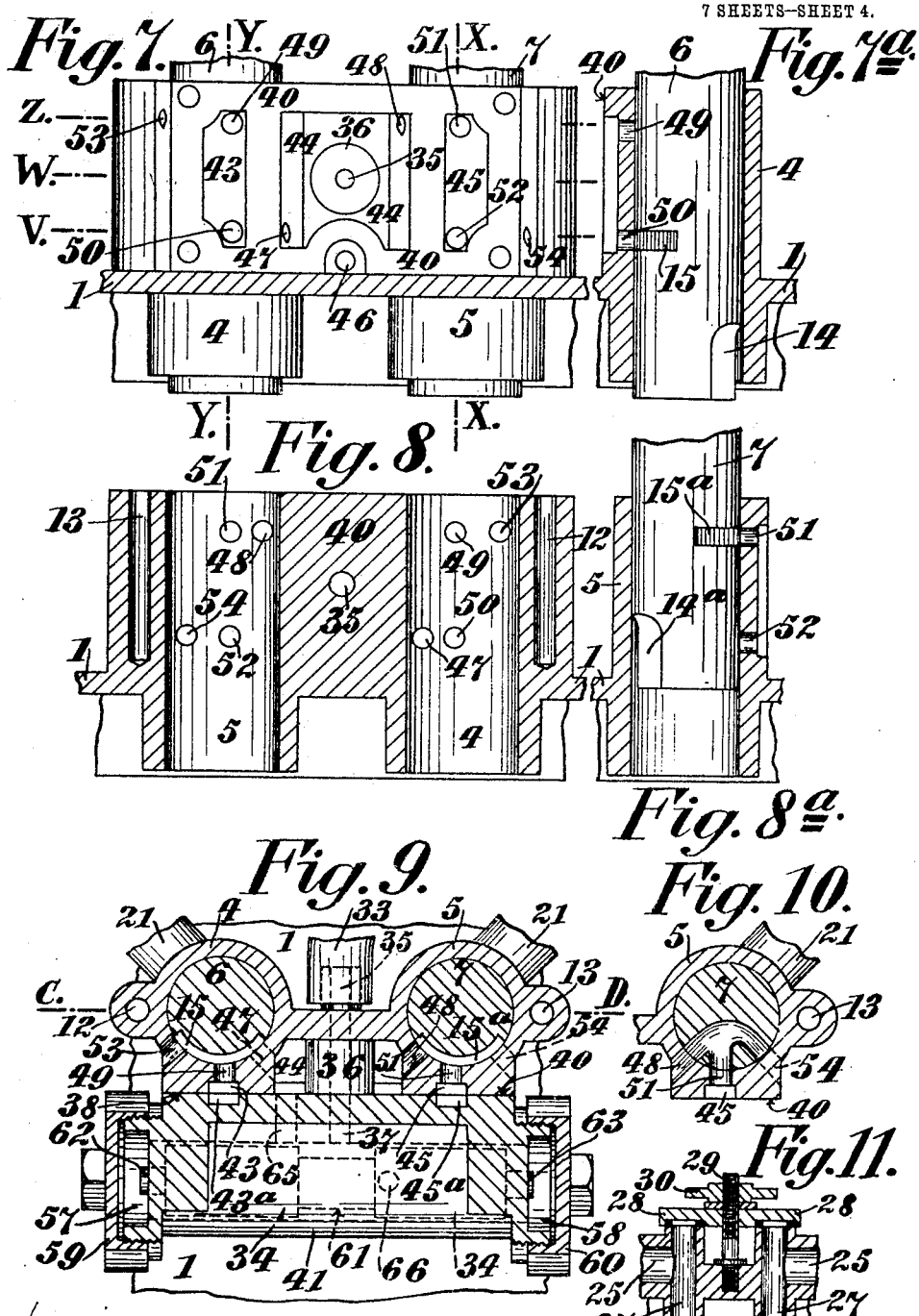

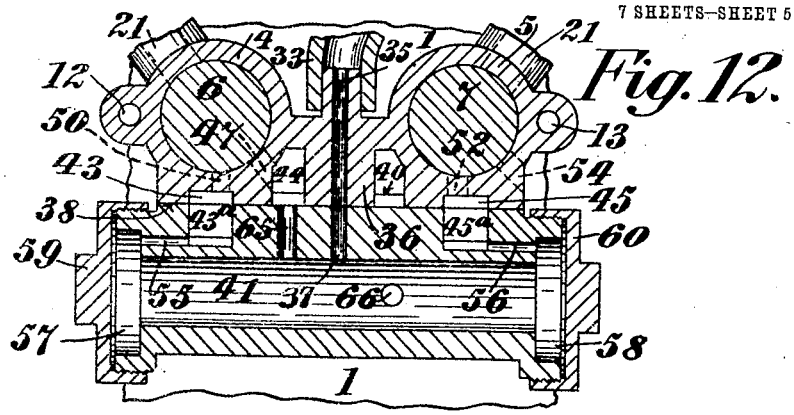
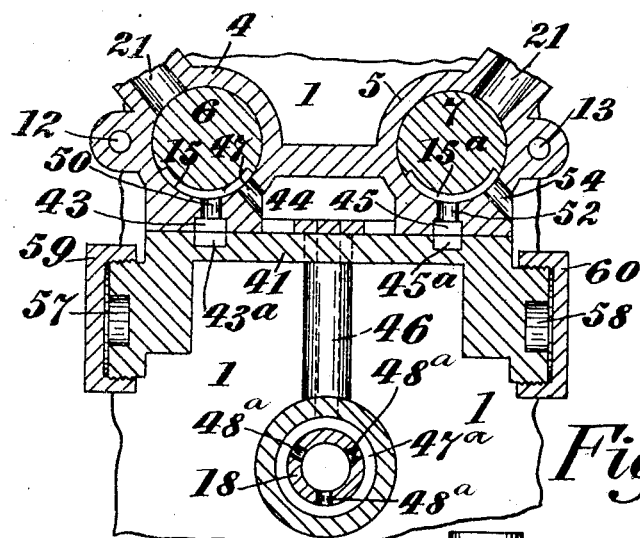
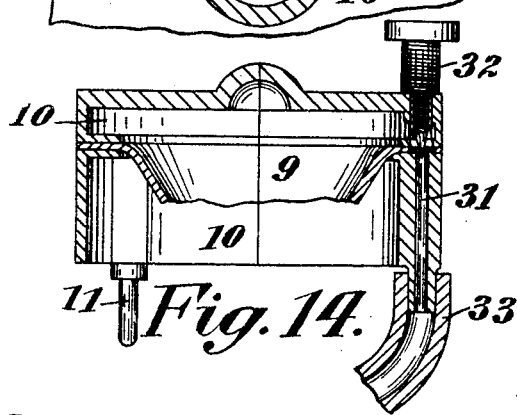

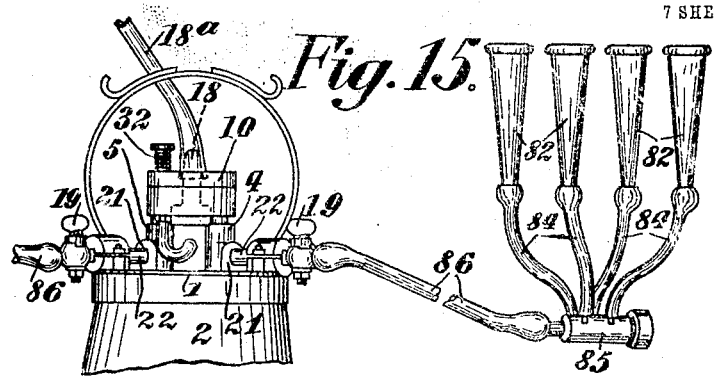
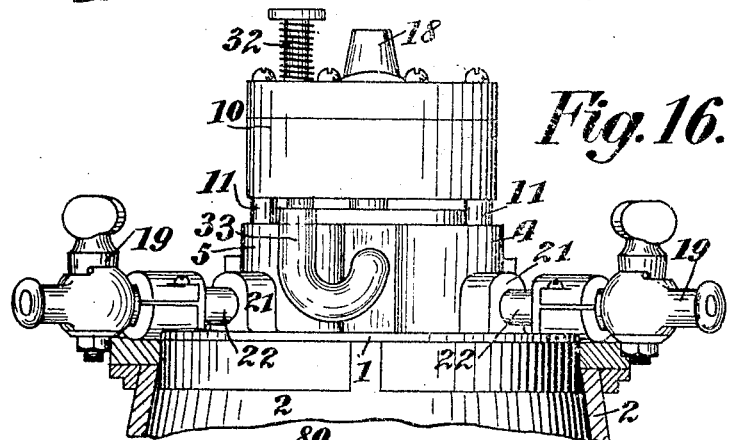
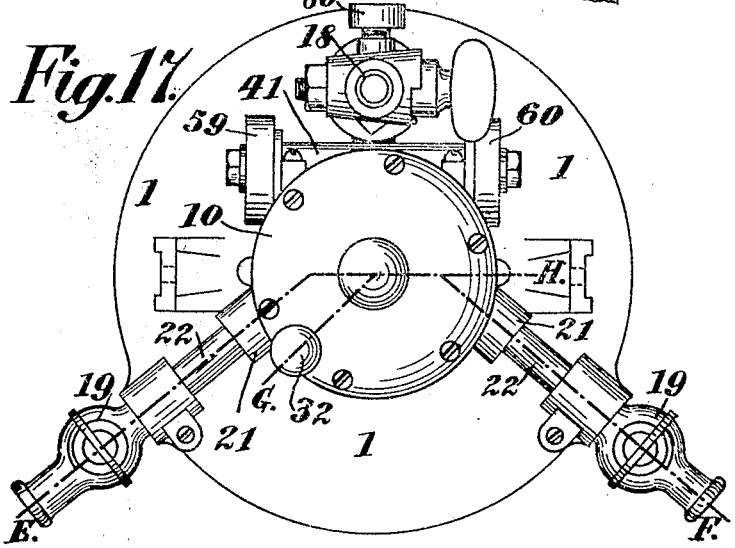

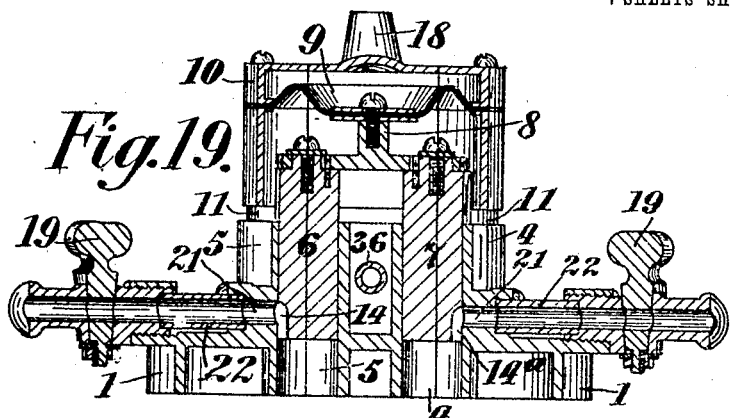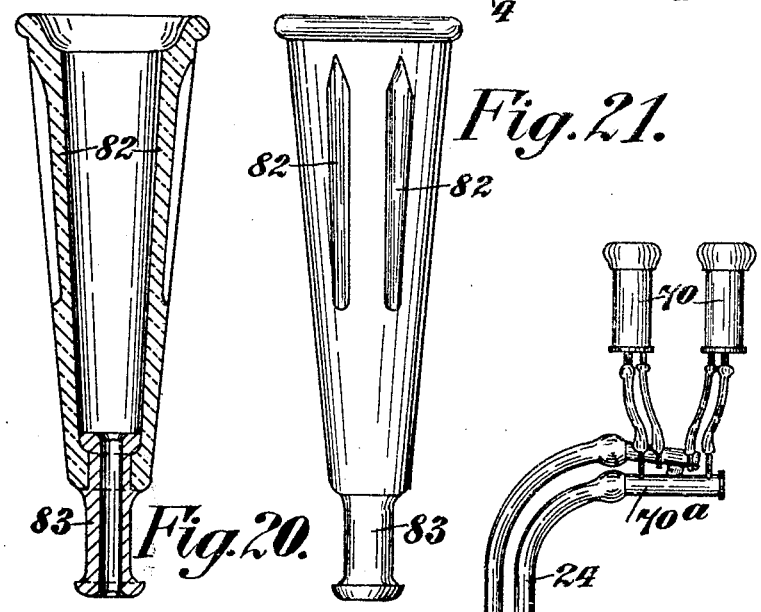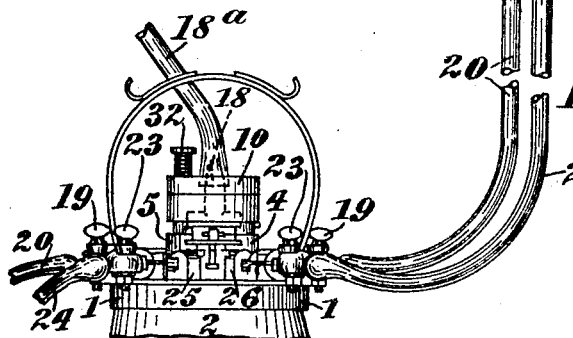

UNITED STATES PATENT OFFICE.

ROBERT KENNEDY, OF GLASGOW, SCOTLAND.

MILKING-MACHINE.

1,064,489.  Specification of Letters Patent.  Patented June 10, 1913.

Application filed January 12, 1910. Serial No. 537,677.

*To all whom it may concern:*

Be it known that I, ROBERT KENNEDY, a subject of the King of Great Britain, and residing at Glasgow, Scotland, have invented certain new and useful Improvements in Milking-Machines, of which the following is a specification.

This invention relates to milking machines of the kind in which alternations of pneumatic pressure usually termed "pulsations" are produced in the teat cups.

The object of the present invention is to improve the construction and action of the mechanism for producing the "pulsations," the said mechanism being of the pneumatically operated type set forth in the prior Patents Nos. 642,044, dated January 23rd, 1900, 784,796, dated March 14th, 1905, and 933,466, dated September 7th, 1909.

Under my present invention the pulsating mechanism comprises:—

First: A pneumatically operated device or valve (for controlling the suction which actuates the motor mechanism of the pulsator) which valve is arranged in combination with, preferably, two pulsator pistons, plungers or valves each of which may be arranged to serve one or more of the teat cups. If desired there may be a single piston plunger or valve or more than two thereof.

Second: Means for shutting off the exhaust connection from the milk receiver and simultaneously therewith admitting air thereto preferably through a filtering device, in order to equalize the pressure therein with that of the atmosphere so that the pulsating apparatus can be easily removed from the milk receiver.

Third: Means for detecting the presence of milk which may accidentally gain access to the air pipes or passages connected with the teat cups.

Fourth: Means for giving easy access to the milk passages of the apparatus for the purpose of cleaning the same.

In order that my invention may be clearly understood I have hereunto appended explanatory drawings which show, by way of example or illustration, two constructions of the improved pulsating apparatus.

Figure 2:
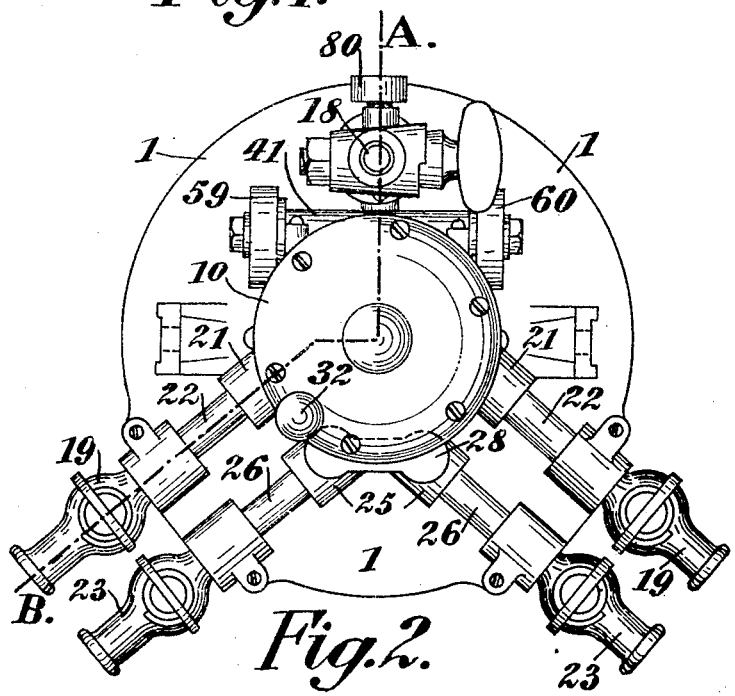
Figure 3:
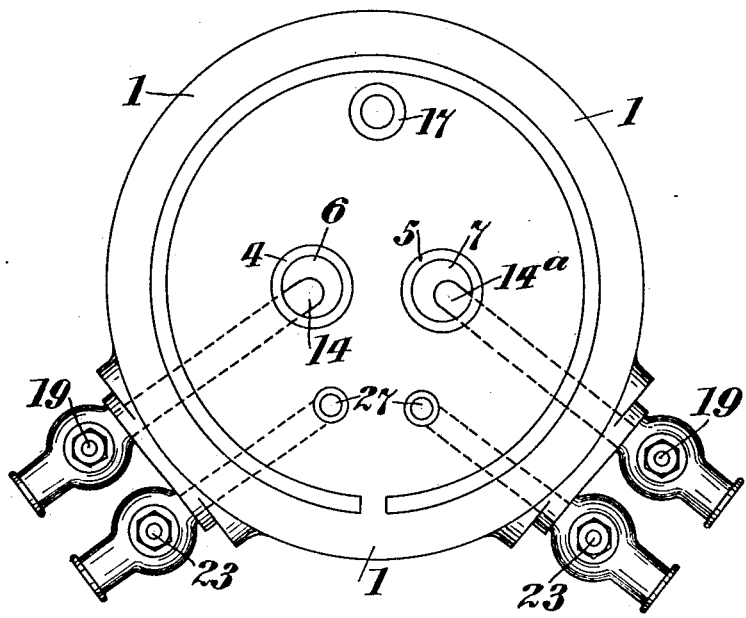
Figure 18:
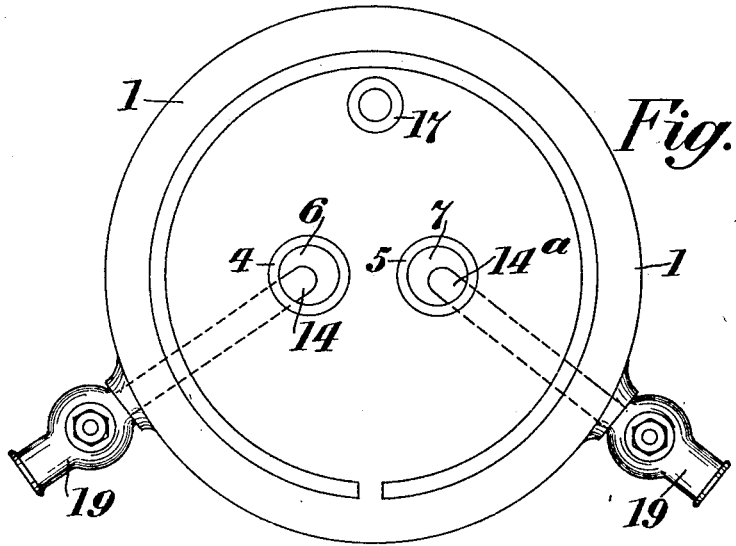

On the drawings:—Figure 1 is a front elevation of one form of the apparatus adapted for double chambered teat cups, a part of the milk receiver being shown in section. Fig. 2 is a plan of Fig. 1. Fig. 3 is an inverted plan showing the underside of the base plate. Fig. 4 is a section on the line A—B Fig. 2. Fig. 5 is a view of the valve casing face 38 and Fig. 5ª an end view of the casing with the cover removed. Fig. 6 is a longitudinal section and Fig. 6ª a cross section of the valve and its casing. Fig. 7 is a view of the face 40 of the cylinder casing. Fig. 7ª is a vertical section of the cylinder 4 on the line Y—Y Fig. 7 and showing the plunger 6 in the down position. Fig. 8 is a vertical section of the cylinders on the line C—D, Fig. 9. Fig. 8ª is a vertical section on the line X—X, Fig. 7 and showing the plunger 7 in the up position. Fig. 9 is a horizontal section on the line Z—Z, Figs. 7 and 5. Fig. 10 shows an alternative arrangement of ports instead of a groove in the plungers. Fig. 11 shows a detail in section. Fig. 12 is a horizontal section on the line W—W Figs. 7 and 5. Fig. 13 is a horizontal section on the line V—V, Figs. 7 and 5. Fig. 14 is a section of the diaphragm chamber taken on the line G, H, Fig. 17. Fig. 15 shows another form of the apparatus adapted for single chambered teat cups. Fig. 16 is an enlarged view of the same. Fig. 17 is a plan of Fig. 16. Fig. 18 is an underside view of same. Fig. 19 is a vertical section on the line E, F, Fig. 17. Fig. 20 is a section and Fig. 21 an elevation of a single chambered teat cup which can be used with the apparatus. Fig. 22 is a view of the apparatus with its attachments for double chambered teat cups.

Referring to the drawings whereon the same reference numerals wherever repeated indicate the same or similar parts, the apparatus when adapted to milk two animals simultaneously with double chambered teat cups consists of a base plate 1 which is adapted to fit on to the mouth of the milk receiver 2 being secured in position airtightly by a rubber ring. The milk receiver is preferably divided into two compartments by a central partition 3. Made in one with or secured to the base plate are two vertical open ended cylinders 4, 5, (as shown at Fig. 19 and also to an enlarged scale at Figs. 7 to 10 and 12 and 13) in which work two plungers 6, 7, these plungers being connected together by a cross head 8, Fig. 19, which latter is secured to a flexible diaphragm 9, Figs. 4, 14 and 19, in a chamber 10 which latter is open at its underside and may be held in position by pins 11 (one of which is shown in full at Fig. 14) engaging holes 12, 13. The plungers are solid and of cylindrical shape the one 6 being provided with a vertical groove 14 and a horizontal groove 15 (see Fig. 7ª) and the other 7 provided with a vertical groove 14ª and horizontal groove 15ª as shown at Fig. 8ª. The vertical groove (14 or 14ª) of each plunger is adapted, when the plunger is in the up position, to open communication between the passage 21, leading to the air chamber of the teat cups, and the interior of the milk receiver, from which the air is exhausted during milking by means of the exhaust port 17 (see Fig. 3), branch 18 and connection 18ª (see Fig. 22) leading to a vacuum pump or other suitable and well known air exhauster. In order to detect the presence of milk which may accidentally gain access to the air pipes I may use any suitable device, but, as a simple arrangement I preferably connect the cock 19 for each air pipe 20 to the passage 21 by a transparent tube 22. The cock 23 for each milk pipe 24 is likewise connected to the passage 25 by a transparent tube 26 (see Figs. 1 and 2). As shown at Figs. 1, 2 and 11, the milk passage 25 for each set of teat cups communicates with a vertical passage 27 open at each end and closed at the upper end by a removable cover 28 held in position, so as to close tightly each passage, (by means of a screw 29 and nut 30). Rubber rings are let into recesses in the underside of the cover so as to close tightly against the upper ends of the passages 27. These passages are easily bored and can be cleaned readily on removing the cover. The milk passages 27, as shown at Fig. 11, extend down through the base plate and are open at their undersides (as shown also at Fig. 3) so that the milk from the teat cups flows direct through these passages into the milk receiver.

The plungers 6 and 7 are reciprocated, within their cylinders, by the action of the diaphragm 9, the air from the upper side of the diaphragm being exhausted for each upward movement, and air being supplied to the upper part of the chamber 10, for each downward movement, the supply and exhaust being controlled by the action of a pneumatically operated controlling valve 34 which is shown clearly at Figs. 5ª, 6 and 6ª. and the operation of which will be subsequently explained. It will be sufficient to state here meantime that when the valve is in one position air is exhausted from the upper side of the diaphragm through the pipe 33 and the passage 31 (which latter can be controlled by means of a screw valve 32), and when the valve is in another position, air is admitted to the upper side of the diaphragm whereupon the suction in the milk receiver acting on the underside of the plungers 6 and 7 pulls the same downward in the same manner as described in the prior specification No. 933466 of 1909.

The flexible pipe 33 is connected, as clearly shown at Fig. 9, to a nipple 35 having a passage therethrough, as shown in dotted lines, which also passes through the tubular part 36 on the face of the cylinder casting 40 (see also Fig. 7) and communicates with the passage 37 (see also Fig. 5) through the face 38 of the valve casing this passage 37 leading to the interior of the valve casing 41 as shown in dotted lines at Figs. 6 and 6ª. The arrangement is also shown at Fig. 4 where the continuous passage 37 can be clearly seen. The cylinder casting is made with three chambers 43, 44, and 45, and the central chamber 44 is in constant communication with the suction nozzle 18 by means of the passage way 46, groove 47ª, and hole 48ª, see Fig. 4. As the hole 48ª is in constant communication with the interior of the milk receiver 2 it follows that so long as a vacuum is maintained in said receiver it will also be maintained in the chamber 44. The chamber 44 can communicate with the cylinders 4, 5, by means of the ports 47, 48, and the chamber 43 can communicate with the interior of the cylinder 4 by means of the ports 49, 50, while the chamber 45 can communicate with the interior of the cylinder 5 by means of the ports 51, 52. The cylinder 4 has a port 53 leading to the outer atmosphere and the cylinder 5 has a port 54 leading to the outer atmosphere. The face 40 of the cylinder casting is trued up and likewise the face 38 of the valve casing is trued up both faces fitting tight against one another the chamber 43 in the cylinder casting corresponding to a chamber 43ª in the valve casing and the chamber 45 in the cylinder casting corresponding to a chamber 45ª in the valve casing. In the valve casing there are passage ways 55 leading to one end of the interior thereof and there are passages 56 leading to the other end of the interior thereof. The ends of the valve casing are shown at Fig. 5ª, where is also clearly seen the ends of the passages 55. The ends of the casing are enlarged slightly, as shown at 57 and 58, Fig. 6, and both ends are provided with screw covers 59, 60. Within the casing is fitted a piston valve 34 having a reduced portion 61, at the center thereof, this valve working tightly, yet freely, in the cylinder and having projections 62, 63, provided with rubber or other soft cushions 64 at the ends thereof so as to prevent noise as the valve oscillates from end to end of the cylinder. There is a port 65 leading from the interior of the valve casing to the chamber 44 and there is a port 66 leading from the interior of the chamber to the atmosphere.

The whole apparatus is pneumatically operated no springs or mechanically operated parts being employed. When the air is exhausted from the milk receiver 2 by opening the cock 67 in the vacuum connection 18 then the suction acts on the lower ends of the plungers 6, 7, and pulls them downward owing to the fact that their lower ends are open to the milk receiver. The combined areas of the two plungers 6 and 7 are less than the area of the diaphragm 9. When the cocks 19, 19, and 23, 23, are opened then the suction in the milk receiver acts in the milk chambers of the teat cups and draws the milk from the cows in the usual manner (two cows being milked with this apparatus simultaneously) and the milk flows direct down the milk tubes 24 through the glass tubes 26 and vertical passages 27 to the milk receiver. The suction in the milk chambers of the teat cups 70, Fig. 22, is approximately constant. The suction in the milk receiver acts through the passages 48ª and 46 to exhaust the air from the chamber 44 and, as the plungers 6 and 7 are now in the down position, the groove 15 of the one plunger will open communication between the port 47 and the port 50 thereby exhausting the air from the chamber 43 while the groove 15ª of the plunger 7 will establish communication between the port 52 and the port 54 thereby admitting air from the atmosphere to the chamber 45, consequently the corresponding chambers 43ª and 45ª of the valve casing will be, the one exhausted and the other supplied with air, the exhaust chamber 43ª being in communication with the left hand end of the bore of the valve casing 41 (Fig. 12) while the air chamber 45ª is in communication with the right hand end of said bore, through the passages 55, 56, respectively; it follows that the pressure of the air at the right hand end of the cylinder will drive the piston valve over to the left hand side thereof thereby bringing the port 65, which leads to the vacuum chamber 44, in communication with the port 37 which leads, by the pipe 33, to the upper side of the diaphragm 9 and, as a consequence, the air is exhausted therefrom so that the atmosphere acting on the underside of the diaphragm 9 will raise the plungers 6 and 7 to the top of their stroke whereupon the vertical grooves 14, 14ª, of these plungers will be put in communication with the air pipes leading to the teat cups so that the air will be exhausted therefrom and also in the air chambers of the cups causing the internal walls of the latter to expand.

The upward movement of the plungers cuts off the communication through the ports 50 and 52 and establishes communication, on the one hand, between the ports 49 and 53 and, on the other hand, between the ports 48 and 51. As a result air is supplied from the atmosphere through the port 53 to the chamber 43 and destroys the vacuum therein while the air in the chamber 45 is exhausted through the port 48 so that now we have the chamber 43 supplied with air and the chamber 45 exhausted; consequently, pneumatic pressure now acts through the passages 55 of the left hand end of the piston valve while air is exhausted by the passages 56 from the right hand end thereof whereupon the valve moves back again to the right (see Fig. 6) and closes the vacuum port 65 and opens the air port 66. The air now gains access, through the port 37 and pipe 33, to destroy the vacuum in the chamber 10 whereupon, the pressures on both sides of the diaphragm being equalized, the suction in the milk receiver acts on the lower ends of the plungers 6 and 7 and again pulls them down, whereupon the action previously described is repeated.

When the plungers are in the up position a certain amount of air is admitted by a valve on the teat cup connector or claw 70ª (see Fig. 22) and which may be the same as described in the specification of the prior Patent No. 933,466 of 1909, with reference to Figs. 17 and 18 thereof and passes down the milk tube to the milk receiver and assists the flow of the milk.

If so desired instead of admitting air at the teat cup connector it may be admitted by the pulsator plungers in the same manner as set forth in the prior Patent 933,466 of 1909.

In milking by pulsating suction with single chambered teat cups or when working with a pulsating suction in the air chambers of double chambered teat cups, it is necessary to admit air to the teat cups in order to reduce the vacuum to the minimum when the plungers are at the bottom of their stroke and this may best be done by admitting air through a restricted orifice or valve in the teat cup connector or teat cups or in the manner set forth in the prior specification No. 933,466 of 1909. By this simple pneumatic arrangement the parts are kept in constant operation so long as the milking is proceeding.

The speed of the apparatus can be controlled by turning the screw 32 so as to regulate the passage of air through the tube 33.

It will be seen that when the plungers 6, 7, are in the up position their vertical grooves 14, 14ª, communicate with the interior of the milk pail so that should the attendant make a mistake in coupling up the milk and air pipe connections with the teat cups the milk will flow directly into the pail.

If, through a mis-connection of the air pipes, or through defective teat cups, or otherwise, milk gains access to the air pipes its presence can be at once detected by means of the glass tubes 22, and thereupon the machine be stopped and the pipes properly connected or the defective teat cups replaced.

It will be seen that all the parts can be simply made, fitted and renewed and that there is nothing in the way of springs or other mechanical parts to get out of order.

Of course by using only one set of connections and one set of cocks 19, 23, the others being closed, a single animal can be milked instead of milking two simultaneously.

The suction nozzle 18, as shown at Fig. 4, is provided with a three way cock 67 and it is so arranged, as shown, that when the suction is cut off from the milk receiver the air can pass through the filter 80 and passage 81 to the interior of the milk receiver so as to equalize the air pressure therein with that of the atmosphere. This arrangement not only insures that the vacuum shall be destroyed in the milk receptacle immediately the vacuum connection is cut off thereby facilitating the removal of the pulsator but it also insures that the air which rushes into the milk receiver shall be filtered before coming in contact with the milk, thereby preventing contamination.

If it is desired to effect the milking with single chambered teat cups, then the arrangement is simplified, as shown at Figs. 15 16, 17, and 18, by dispensing simply with the connections 23, 26, 25, and operating the single chambered teat cups with a pulsating suction due to the action of the plungers 6, 7. Of course, milking with single chambered teat cups can be effected quite well with the arrangement shown at Figs. 1 to 14 by simply connecting up the cocks 19, 19, only and closing the cocks 23, 23.

Figs. 20 and 21 show a form of single chambered teat cup which may be employed with the apparatus this cup being made of rubber or other flexible material and being provided with a series of longitudinal grooves 82 at its outside. 83 is the nipple for connecting to the pipes 84 leading to the connector 85 and pipes 86.

Instead of having grooves 15, 15ª, in the plungers 6 and 7 I may have three holes bored in each plunger as shown at Fig. 10 these holes communicating with one another. These holes are more easily made than the grooves.

It will be noted that the piston valve can be readily taken out of the valve casing and replaced by a fresh valve when worn.

Having now fully described my invention what I claim and desire to secure by Letters Patent is:—

1. In a milking machine both controlled and operated automatically by suction, pulsating mechanism comprising, in combination, a movable device which is operated pneumatically, a plurality of members connected to the device and moving therewith, said members being moved by the device in one direction and by the suction, which constantly acts thereon, in the other direction, and pneumatically operated means controlled by said members for controlling the pulsating operation.

2. In a milking machine both controlled and operated automatically by suction, pulsating mechanism comprising, in combination, a pair of members constantly acted on by the suction, a chamber, pneumatically operated means within the chamber, for moving said members against the said suction, and pneumatically operated means controlled by said members for controlling the operation of the said means within the chamber.

3. In a milking machine both controlled and operated automatically by suction, pulsating mechanism comprising, in combination, a movable device having a pair of parallel members constantly acted on by the suction, a chamber, a diaphragm within the chamber and connected to said device and pneumatically operated means controlled by said movable device for controlling the operation of the diaphragm within the chamber.

4. In a milking machine both controlled and operated automatically by suction, pulsating mechanism comprising, in combination, a movable device having a pair of members constantly acted on by the suction, a chamber, a pneumatically operated diaphragm within the chamber for operating the device and pneumatically operated means controlled by said movable device for controlling the admission of air to and its exhaust from the said chamber.

5. In a milking machine both controlled and operated automatically by suction, pulsating mechanism comprising, in combination, a movable device having a pair of parallel members constantly acted on by the suction, a chamber, a diaphragm within the chamber for moving the said device against the said suction, and pneumatically operated means controlled by said movable device for controlling the admission of air to and its exhaust from the said chamber.

6. In a milking machine both controlled and operated automatically by suction, pulsating mechanism comprising, in combination, a movable device having a pair of parallel depending members constantly acted on by the suction, a chamber, means within the chamber and pneumatically operated for moving the said device and members against the said suction, and means operated pneumatically for controlling the admission of air to and its exhaust from the said chamber.

7. In a suction milking machine pulsating mechanism comprising, in combination, a movable valve device having one end thereof constantly acted on by the suction, a casing for said device having vacuum and air admission ports therein, a chamber, means within the chamber for moving said device, vacuum and air chambers in said casing, ports connecting the vacuum and air chambers with the portion of the casing occupied by said valve-moving means, a pneumatically operated controlling valve, and a casing for said valve with ports therein communicating with said chambers.

8. In a suction milking machine pulsating mechanism comprising, in combination, a movable valve device having one end thereof constantly acted on by the suction, a casing for said device having vacuum and air admission ports therein, a chamber, means within the chamber for moving said device, a vacuum chamber in said casing, a second chamber in said casing which is alternately supplied with and exhausted of air, a pneumatically operated controlling valve, and a casing for said valve with ports therein communicating with said chambers.

9. In a suction milking machine pulsating mechanism comprising, in combination, a movable valve device having one end thereof constantly acted on by the suction, a casing for said device having vacuum and air admission ports therein, a chamber, means within the chamber for moving said device, vacuum and air chambers in said casing, ports connecting the vacuum and air chambers with the portion of the casing occupied by said valve-moving means, a control slide valve adapted to reciprocate, a casing within which said valve reciprocates, said valve casing having ports therein communicating with the atmosphere and with said chambers.

10. In a milking machine both controlled and operated automatically by suction, pulsating mechanism comprising, in combination, two movable valve devices each having one end thereof acted on by suction, a casing for said devices having vacuum and air admission ports therein, a chamber, pneumatically operated means in said chamber for moving both said devices, vacuum and air chambers in said casing, ports connecting the vacuum and air chambers with the portion of the casing occupied by said valve-moving means, a pneumatically operated controlling valve, and a casing for said valve with ports therein communicating with said chambers.

11. In a milking machine both controlled and operated automatically by suction pulsating mechanism comprising, in combination, two movable valve devices each having one end thereof acted on by suction, a casing for said devices having air admission ports therein, a chamber, pneumatically operated means in said chamber for moving both said devices, a centrally situated vacuum chamber in said casing, two chambers adapted to be each alternately supplied with and exhausted of air, said casing being made with ports communicating with the central vacuum chamber and with the chambers adapted to be alternately supplied with and exhausted of air, a pneumatically operated controlling valve, and a casing for said valve with ports therein communicating with said chambers.

12. In a milking machine both controlled and operated automatically by suction pulsating mechanism comprising, in combination, two movable valve devices each having one end thereof acted on by suction, two cylindrical casings one for each device, a metal connection between said cylindrical casings, an exhaust chamber in said connection, two chambers adapted to be each alternately supplied with and exhausted of air in said cylindrical casings, a pneumatically operated controlling valve, a casing for said valve having chambers therein registering with the chambers of the cylindrical casings and ports from said chambers to the ends of the controlling valve casing, and ports in said movable devices for alternately supplying air to and exhausting it from said chambers in the cylindrical casings.

13. In a milking machine both controlled and operated automatically by suction pulsating mechanism comprising, in combination, two movable valve devices each having one end thereof acted on by suction, a casing for said devices having vacuum and air admission ports therein, a chamber, pneumatically operated means in said chamber for moving both said devices, a centrally situated vacuum chamber in said casing, two chambers each adapted to be alternately supplied with and exhausted of air, said casing being made with ports communicating with the central vacuum chamber with the air and with the chambers adapted to be alternately supplied with and exhausted of air, a reciprocating controlling valve, a casing for said valve with air exhaust and admission ports at each end thereof communicating with the chambers adapted to be alternately supplied with and exhausted of air and with a port for air admission, a port for air exhaust and another port for supplying air to and exhausting it from said chamber having operating means therein for moving said devices.

14. In a milking machine both controlled and operated automatically by suction pulsating mechanism comprising, in combination, two movable valve devices each having one end thereof acted on by suction, a casing for said devices having vacuum and air admission ports therein, a chamber, a pneumatically operated diaphragm therein, means connecting said diaphragm and devices, a centrally situated vacuum chamber in said casing, two chambers adapted to be each alternately supplied with and exhausted of air, said casing being made with ports communicating with the central vacuum chamber with the air and with the chambers adapted to be alternately supplied with and exhausted of air, a reciprocating control valve with a reduced part at its center, a removable casing for said valve provided with ports leading from said two chambers to the ends of the casing, removable ends on said valve casing, air admission and exhaust ports in the valve casing, opened and closed by the movements of said valve, and a port in the said valve casing communicating with the diaphragm chamber, said port being controlled by the valve and being adapted to supply air to and exhaust it from the diaphragm chamber.

15. In a milking machine both controlled and operated automatically by suction pulsating mechanism comprising, in combination, two movable valve devices each having one end thereof acted on by suction, a casing for said devices having vacuum and air admission ports therein, a chamber, a pneumatically operated diaphragm therein, means connecting said diaphragm and devices, a centrally situated vacuum chamber in said casing, two chambers adapted to be each alternately supplied with and exhausted of air, said casing being made with ports communicating with the central vacuum chamber with the air and with the chambers adapted to be alternately supplied with and exhausted of air, a reciprocating control valve of cylindrical shape with a reduced part at its center, a casing for said valve having chambers registering with the said two chambers in the casing of said devices, a port in the valve casing for air admission, a port in said valve casing for air exhaustion and a port in said casing communicating with said diaphragm chamber.

16. A milking machine which is both controlled and operated automatically by suction having, in combination, a milk receiver, a base adapted to fit on the milk receiver, a valve for either admitting air to the milk receiver or allowing it to be exhausted therefrom, a pneumatically operated pulsator on the base, a pneumatically operated valve for controlling the action of said pulsator, and teat cup connections.

17. A milking machine which is both controlled and operated automatically by suction having, in combination, a milk receiver, a base adapted to fit on the milk receiver, a valve for either admitting air to the milk receiver or allowing it to be exhausted therefrom, an air filter in connection with the valve, a pneumatically operated pulsator on the base, a pneumatically operated valve for controlling the action of said pulsator and teat cup connections.

18. A milking machine which is both controlled and operated automatically by suction having, in combination, a milk receiver, a base adapted to fit on the milk receiver, a valve for either admitting air to the milk receiver or allowing it to be exhausted therefrom, a pneumatically operated pulsator on the base, a pneumatically operated valve for controlling the action of said pulsator, a milk connection on the base, an air connection on the base, means for indicating the milk flow in both connections, teat cups each communicating with both said connections and means for opening and closing said connections.

19. A milking machine which is both controlled and operated automatically by suction having, in combination, a milk receiver, a base adapted to fit on the milk receiver, a valve for either admitting air to the milk receiver or allowing it to be exhausted therefrom, a pneumatically operated pulsator on the base, a pneumatically operated valve for controlling the action of said pulsator, a milk connection on the base, an air connection on the base, means for establishing communication through the pulsator between the air connection and the interior of the milk receiver, means for establishing direct communication between the milk connection and the interior of the receiver and teat cups each communicating with both said connections and means for opening and closing said connections.

20. A milking machine which is both controlled and operated automatically by suction having, in combination, a milk receiver, a base adapted to fit on the milk receiver, a valve for either admitting air to the milk receiver or allowing it to be exhausted therefrom, a pneumatically operated pulsator on the base, a pneumatically operated valve for controlling the action of said pulsator, a milk connection on the base, an air connection on the base, means for establishing communication through the pulsator between the air connection and the interior of the milk receiver, means for establishing direct communication between the milk connection and the interior of the receiver, a removable cover for said direct connections, teat cups each communicating with both said connections and means for opening and closing said connections.

21. A milking machine which is both controlled and operated automatically by suction having, in combination, a milk receiver, a base adapted to fit on the milk receiver, a valve for either admitting air to the milk receiver or allowing it to be exhausted therefrom, two pneumatically operated pulsators on the base, a pneumatically operated valve for controlling the action of said pulsators, and teat cup connections.

22. A milking machine which is both controlled and operated automatically by suction having, in combination, a milk receiver, a base adapted to fit on the milk receiver, a valve for either admitting air to the milk receiver or allowing it to be exhausted therefrom, two pneumatically operated pulsators on the base, a pneumatically operated valve for controlling the action of said pulsators, a milk connection on the base, an air connection on the base, means for establishing communication through the pulsator between the air connection and the interior of the milk receiver, means for establishing direct communication between the milk connection and the interior of the receiver a removable cover for said direct connections, teat cups each communicating with both said connections and means for opening and closing said connections.

23. A milking machine which is both controlled and operated automatically by suction, having, in combination, a milk receiver, a base adapted to fit on the milk receiver, a valve for either admitting air to the milk receiver or allowing it to be exhausted therefrom, a pneumatically operated pulsator on the base, a pneumatically operated valve for controlling the action of said pulsator, a milk connection on the base, an air connection on the base, transparent means for observing the flow of milk in both connections, teat cups each communicating with both said connections and means for opening and closing said connections.

In testimony whereof I affix my signature in presence of two witnesses.

ROBERT KENNEDY.

Witnesses:
HUGH D. FITZPATRICK,
ANDREW HAMILTON.